SERIAL-TO-PARALLEL BINARY CODE CONVERTER DEVICE
Filed June 23, 1958
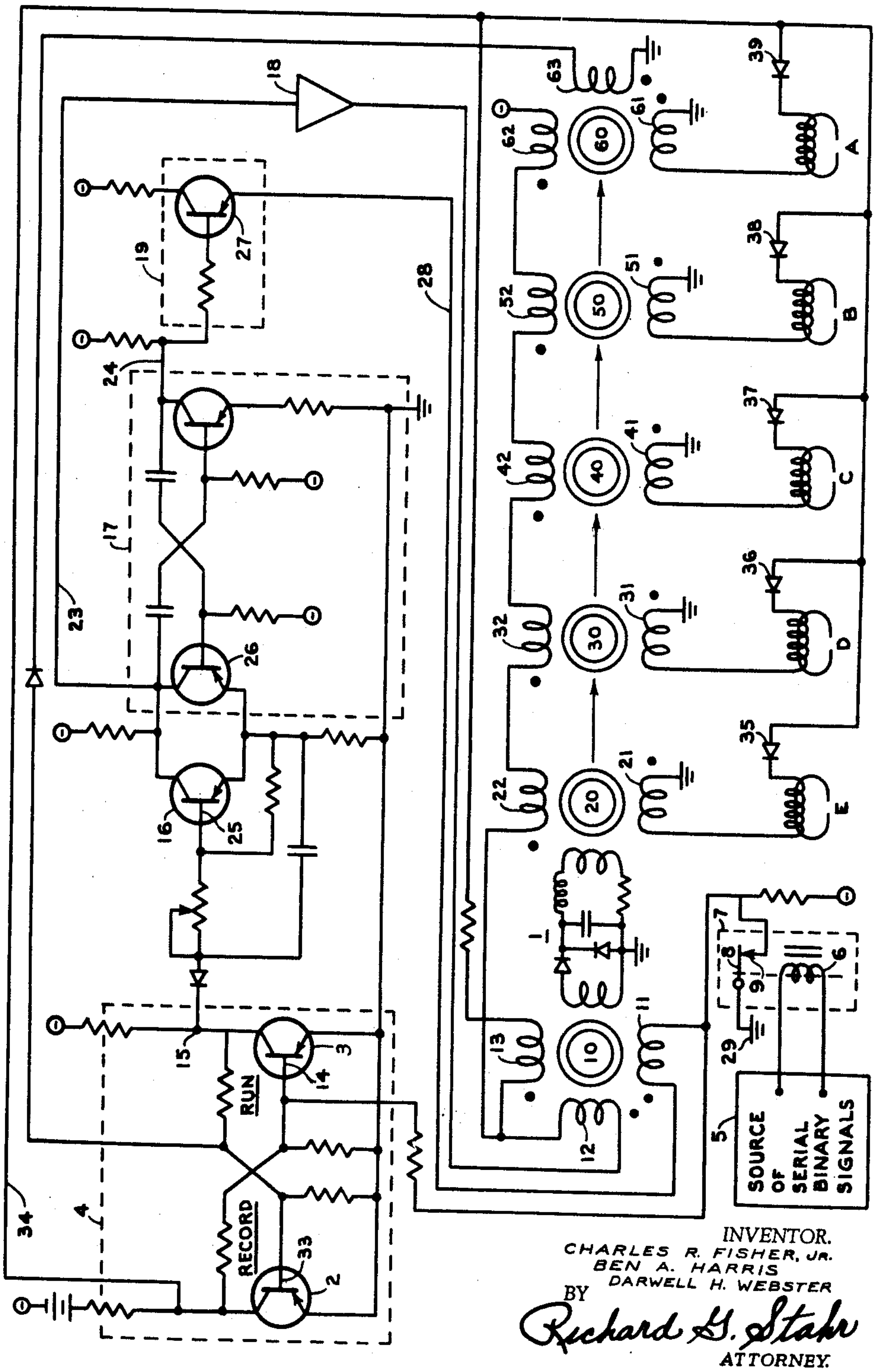
INVENTOR.
CHARLES R. FISHER, JR.
BEN A. HARRIS
DARWELL H. WEBSTER
BY Richard G. Stahr
ATTORNEY.

United States Patent Office 2,951,242

Patented Aug. 30, 1960

2,951,242

SERIAL-TO-PARALLEL BINARY CODE CONVERTER DEVICE

Charles R. Fisher, Jr., and Ben A. Harris, Rochester, and Darwell H. Webster, Palmyra, N.Y., assignors to General Dynamics Corporation, Rochester, N.Y., a corporation of Delaware Filed June 23, 1958, Ser. No. 743,782

10 Claims. (Cl. 340—174)

The present invention relates to a device for converting binary code information bits of serial form into parallel form and, more specifically, to a device of this type employing only solid-state components.

There are numerous applications, particularly with the use of information which is expressed in binary code, in which it is necessary to convert binary code signals of serial form into binary code signals of parallel form. In these applications, it is important that a device be employed which is fast and accurate in its operation.

It is, accordingly, an object of this invention to provide an improved serial-to-parallel binary code converter device.

It is another object of this invention to provide a serial-to-parallel binary code converter device employing only solid-state components.

In accordance with this invention, the information bits of a character expressed in binary code are stored in respective stages of a circuit of the type having a plurality of stages, each of which has two stable conditions of operation corresponding to the polarity of the respective bit stored therein, which is adapted to advance the stable condition of operation of each stage to the next succeeding stage and is characterized by the production of an output energizing current pulse in an individual output circuit coupled to each stage upon a reversal of the condition of operation of that stage. A locally generated signal energizing current pulse is applied to the initial stage of this circuit only upon the receipt of binary information bits of a preselected polarity, producing the stable condition of operation selected to correspond to that polarity which is advanced to the next succeeding stage by a locally generated advance energizing current pulse. At the conclusion of each character, a reset energizing current is applied simultaneously to all stages which reverses the stable condition of operation of those stages which are in the stable condition of operation corresponding to the binary information bits of the preselected polarity thereby producing an output energizing current pulse in each of the respective individual output circuits coupled thereto.

For a better understanding of the present invention, together with further objects, advantages and features thereof, reference is made to the following description and accompanying drawing, in which the single figure illustrates the preferred embodiment of the present invention.

To facilitate the description of this invention, and in no way intending or inferring that it be limited thereto, a specific example of an application of this invention is in the teletypewriter switching art. In this instance, the binary information bit signals, termed "mark" bits or "space" bits depending upon their polarity, which are received over the incoming lines in serial form are converted into binary information signals of parallel form for recording on magnetic or perforated tape.

To provide a circuit having a plurality of stages in which the respective information bits of a character expressed in binary code may be stored, a magnetic shift register circuit is employed. This shift register comprises six magnetic core members indicated by reference numerals 10, 20, 30, 40, 50 and 60. While these magnetic members are indicated as being toroidal in shape, members of any desired shape or form may be used. Each of these magnetic members is composed of a magnetic material having substantially square hysteresis loop characteristics and each is capable of being magnetically saturated in two stable conditions of saturation, hereinafter designated the "1" and the "0" conditions of saturation, thereby providing the required two stable conditions of operation corresponding to the polarity of the respective bits. That is, one stable condition of operation corresponds to respective information bits of a first polarity while the other stable condition of operation corresponds to respective information bits of another polarity. So that this circuit may be adapted to advance the stable condition of operation of each stage to the next succeeding stage, a unidirectional transfer circuit intercouples the respective members. This circuit is detailed at 1, intercoupling cores 10 and 20, and, since it is identical between each of the next succeeding members, is thereafter indicated only by arrows.

To locally generate signal energizing current pulses and advance energizing current pulses in timed relation with the serial binary input signals, a free-running multivibrator 17 is employed. This multivibrator operates at a frequecy of 1 cycle per bit of the incoming signal and produces an output energizing current alternately to the advance pulse shaping amplifier 18 and the gate amplifier 19 through leads 23 and 24, respectively, for each cycle. As the details of advance pulse shaping amplifier 18 forms no part of this invention, it is indicated in block form in the drawing. To control multivibrator 17, a bi-stable multivibrator 4 is employed, the operation of which will be detailed later.

To provide a basis for a clear explanation of this device, and in no way intending or inferring that it be limited thereto, it will be assumed that the "1" stable condition of operation is selected to correspond to information bits of a polarity representing the "mark" bits and that the "0" stable condition of operation will correspond to the other polarity or "space" bits and that the initial condition of operation of this device is such that magnetic member 10 of the shift register circuit is in the "1" condition of operation while the remaining members, 20—60, are in the "0" condition of operation and transistor 2 of bi-stable multivibrator 4 is conducting. The method of establishing these initial conditions of operation will be explained in detail later in this specification.

A source of serial form binary signals, the details of which form no part of this invention, is indicated in block form at reference numeral 5 and is shown connected to the operation coil 6 of an electromechanical relay 7. The relay contacts 8 and 9 are normally in the closed or "mark" position and are arranged to be operated to their open or "space" position upon the receipt of a "space" information bit. While this switching device has been indicated as an electromechanical relay, it is to be specifically understood that a solid-state switching device may also be employed so long as it is closed in the "mark" position and opened in the "space" position.

A bi-stable multivibrator circuit, indicated at reference numeral 4, is employed to start free-running multivibrator 17 at the beginning of each character and to stop free-running multivibrator 17 and produce a reset energizing current at the conclusion of each character in a manner to be explained.

While the device of this invention is in its initial condition of operation, with transistor 2 of bi-stable multivibrator 4 conducting and transistor 3 not conducting, point 15 is negative, thereby producing a negative potential upon the base 25 of transistor 16, causing conduction therethrough. With transistor 16 conducting, the operating potential to transistor 26 of free-running multivibrator 17 is short circuited, thereby preventing the operation of bi-stable multivibrator 17 during this period.

As the "start of character" bit in the teletypewriter switching art is a "space" bit, contacts 8 and 9 of relay 7 are opened at the beginning of each character. As contacts 8 and 9 are opened, the base 14 of transistor 3 of bi-stable multivibrator 4 goes negative, causing transistor 3 to conduct which extinguishes transistor 2. As transistor 3 conducts, point 15 goes essentially to ground potential, resulting in a ground potential upon the base 25 of transistor 16. With ground potential upon its base, the base-emitter bias requirements of a P–N–P transistor are not satisfied and transistor 16 extinguishes, thereby removing the short circuit across transistor 26 of free-running multivibrator 17, causing it to begin oscillating. The operation of bi-stable multivibrator 4 in stopping free-running multivibrator 17 and producing a reset energizing current will be explained later.

As multivibrator 17 begins operation, the first or advance energizing current pulse is directed through lead 23 to advance pulse shaping amplifier 18 from which it is applied simultaneously to all stages, members 10, 20, 30, 40, 50 and 60 of the shift register circuit through a coupling circuit comprising coils 12, 22, 32, 42, 52 and 62, respectively, in a polarity sense for producing the "0" stable condition of operation in all of these stages. As member 10 is in the "1" condition of operation, this stable condition of operation is thereby advanced to member 20 through transfer circuit 1 in a manner common to all shift register circuits.

One-half a bit later, the locally generated signal energizing current pulse produced by multivibrator 17 is applied to the initial stage, member 10, of the shift register circuit, only upon the receipt of a serial binary information bit of a preselected polarity for producing therein the stable condition of operation selected to correspond to that polarity, through a coupling circuit comprising lead 24, gating amplifier 19 and coupling coil 11. Assuming the preselected polarity information bits to be the "mark" bits, should the initial bit of the character being received be a "mark" bit, contacts 8 and 9 of relay 7 will be in their closed or "mark" position, thereby establishing a coupling circuit to the initial member 10 of the shift register circuit from the negative side of battery through transistor 27 of gating amplifier 19, through lead 28, coupling winding 11 of magnetic member 10 and point of reference potential 29. The sense of coupling winding 11 is such to produce the stable condition of operation in member 10 selected to correspond to the polarity of the "mark" information bits, in this instance, the "1" condition. Should the initial bit of the character being received be a "space" bit, contacts 8 and 9 of relay 7 will be in their open or "space" position, thereby interrupting the coupling circuit previously outlined. In this instance, then, no current will flow in coupling winding 11, allowing member 10 to remain in its "0" condition of operation which corresponds to the polarity of the "space" information bits.

One-half a bit later, the advance energizing current pulse is again applied through lead 23 and advance pulse shaping amplifier 18 through the advance coupling windings 12, 22, 32, 42, 52 and 62, thereby advancing the "1" condition of operation of magnetic member 20 to magnetic member 30.

As multivibrator 17 operates through the receipt of the character, the advance energizing current pulses successively advance the stable condition of operation of each member of the shift register circuit to the next succeeding member and the alternate local signal energizing current pulses produce a "1" condition of operation, corresponding to the polarity of the "mark" bits, in the initial stage, member 10, of the shift register circuit, only upon the receipt of a "mark" information bit which renders contacts 8 and 9 of relay 7 closed.

In this manner, then, the information bits of a character expressed in binary form are stored in respective magnetic members of the shift register circuit.

As the teletypewriter binary code expresses each character by five information bits, the sixth advance energizing current pulse cause the "1" condition of operation, which originated as the initial condition of operation in member 10 but which is now in member 60, to be transferred out producing a pulse in coil 63 of member 60 through transformer action and also advances the stable condition of operation of each of the members to the next succeeding member, resulting in the storage of the information bits of the first character in respective members 20, 30, 40, 50 and 60.

The output energizing current pulse produced in coil 63, however, is applied to the base 33 of transistor 2 of bi-stable multivibrator 4, producing conduction therein and extinguishing transistor 3. As transistor 2 conducts and transistor 3 is extinguished, point 15 again goes negative which places a negative potential upon the base 25 of transistor 16, thereby biasing it to conduction. As transistor 16 conducts, free-running multivibrator 17 is stopped in that battery potential is removed from the emitter-collector circuit of its initial transistor 26 by the short circuit resulting from the conduction of transistor 16.

At the same time, a reset energizing current is produced in lead 34 and is applied simultaneously to all members 10, 20, 30, 40, 50 and 60, of the shift register circuit through a coupling circuit consisting of coils 13, 22, 32, 42, 52 and 62, respectively. The sense of these coupling windings is such as to produce in the first stage, member 10, the stable condition of operation selected to correspond to the polarity of the preselected polarity bits and the opposite condition of operation in all other stages. In this instance, then, the reset energizing current produces the "1" stable condition of operation in the first stage, member 10, which corresponds to the polarity of the "mark" bits and the "0" condition of operation in all the other stages. As the sense of coupling windings 22, 32, 42, 52 and 62 of members 20, 30, 40, 50 and 60, respectively, are such as to produce the "0" condition of operation in these members, the condition of operation of all those members which are in the condition of operation selected to correspond to the polarity of the preselected bits, in this instance the "1" condition of operation corresponding to the polarity of the "mark" bits, is reversed. At the same time, the reset energizing current places the shift register circuit in its initial condition of operation, that is, the initial stage, member 10, in the "1" condition of operation and the remaining stages in the "0" condition of operation, which prepares the shift register circuit for the reception and storage of the respective information bits of the next character.

Coupled to each stage except the first, members 20, 30, 40, 50 and 60, of the shift register circuit is an individual output circuit indicated by coils 21, 31, 41, 51 and 61, respectively. As the condition of operation of any of these stages is reversed, an output energizing current pulse will appear in the respective individual output circuit coupled thereto.

Shown at A, B, C, D and E are the respective magnets of a recording head which may be used to magnetize a magnetic tape. These magnets may be replaced by any other parallel recording device such as a tape perforator. As an output energizing current pulse appears in those individual output circuits which are coupled to members of the shift register circuit which have had their condition of operation reversed by the reset energizing current, it will be applied to the energizing coils of the respective magnets of the recording head. Assuming the character "F" has been received for which the binary code is a "mark" for the first, third and fourth bits and a "space" for the second and fifth bits, magnets A, C and D will receive an output energizing pulse while magnets B and E receive no output energizing current pulses.

As an output energizing current pulse will also appear in the respective individual output circuit windings each time the advance energizing current pulse transfers a "1" condition of operation from any member to the next succeeding member, respective diodes 35, 36, 37, 38 and 39 are provided. During the reception of a character, transistor 2 of bi-stable multivibrator 4 is extinguished and a negative potential is placed upon these diodes through lead 34, thereby preventing conduction therethrough. However, as transistor 2 of multivibrator 4 begins conduction at the conclusion of a character in a manner as previously outlined, the potential upon lead 34 is essentially ground, thereby permitting conduction through these respective diodes at the time the members of the magnetic shift register circuit are read out in parallel by the reset energizing current.

While a preferred embodiment of the present invention has been shown and described, it will be obvious to those skilled in the art that various modifications and substitutions may be made without departing from the spirit of the invention which it to be limited only within the scope of the appended claims.

What is claimed is:

1. A device for converting binary code information bits of serial form into parallel form comprising a source of serial form binary information bit signals; first circuit means of the type having a plurality of stages for storing the respective binary information bits of a character expressed in binary form, each stage being capable of two stable conditions of operation corresponding to the polarity of the respective binary information bits and each characterized by the production of an output energizing current pulse with each reversal of condition of operation, said first circuit means being adapted to advance the stable condition of operation of each stage to the next succeeding stage; second circuit means for generating advance energizing current pulses and local signal energizing current pulses alternately in timed relationship with said serial form binary information bit signals; first coupling circuit means for applying said locally generated signal energizing current pulses to the first stage of said first circuit means only upon the receipt of a serial binary information bit of a preselected polarity for producing therein the stable condition of operation selected to correspond to that polarity; second coupling circuit means for applying said advance energizing current pulses simultaneously advancing the stable first circuit means for successively advancing the stable condition of operation produced by said signal energizing current pulses from each stage to the next succeeding stage; third circuit means including the necessary coupling circuit means for starting said second circuit means at the beginning of each character in response to the receipt of a binary information bit of a preselected polarity and for stopping said second circuit means and producing a reset energizing current at the end of each character in response to the reversal of condition of operation of the last stage of said first circuit means; third coupling circuit means for applying said reset energizing current simultaneously to all stages of said first circuit means for producing the condition of operation in the first stage the same as that selected to correspond to the polarity of the said preselected polarity bits and the opposite condition of operation in all other stages thereby reversing the condition of operation of all stages which are in the stable condition of operation selected to correspond to the polarity of the said preselected polarity bits and placing said first circuit means in its initial condition of operation and an individual output circuit means coupled to each stage of said first circuit means except the first in each of which an output energizing current pulse appears in response to the reversal of the condition of operation of the stage to which it is coupled.

2. A device of the type described in claim 1 in which said first circuit means is a magnetic core shift register circuit.

3. A device of the type described in claim 1 in which said second circuit means is a free-running multivibrator.

4. A device of the type described in claim 1 in which said third circuit means is a bi-stable multivibrator.

5. A device for converting binary code information bits of serial form into parallel form comprising a source of serial form binary information bit signals; a shift register circuit having a plurality of stages for storing the respective binary information bits of a character expressed in binary form, each stage being capable of two stable conditions of operation corresponding to the polarity of the respective binary information bits and each characterized by the production of an output energizing current pulse with each reversal of condition of operation; first circuit means for generating advance energizing current pulses and local signal energizing current pulses alternately in timed relationship with said serial form binary information bit signals; first coupling circuit means for applying said locally generated signal energizing current pulses to the first stage of said shift register circuit only upon the receipt of a serial binary information bit of a preselected polarity for producing therein the stable condition of operation selected to correspond to that polarity; second coupling circuit means for applying said advance energizing current pulses simultaneously to all stages of said shift register circuit for successively advancing the stable condition of operation produced by said signal energizing current pulses from each stage to the next succeeding stage; second circuit means including the necessary coupling circuit means for starting said first circuit means at the beginning of each character in response to the receipt of a binary information bit of a preselected polarity and for stopping said first circuit means and producing a reset energizing current at the end of each character in response to the reversal of condition of operation of the last stage of said shift register circuit; third coupling circuit means for applying said reset energizing current simultaneously to all stages of said shift register circuit for producing the condition of operation in the first stage the same as that selected to correspond to the polarity of the said preselected polarity bits and the opposite condition of operation in all other stages thereby reversing the condition of operation of all stages which are in the stable condition of operation selected to correspond to the polarity of the said preselected polarity bits and placing said shift register circuit in its initial condition of operation and individual output circuit means coupled to all stages of sad first circuit means except the first in each of which an output energizing current pulse appears in response to the reversal of the condition of operation of the stage to which it is coupled.

6. A device of the character described in claim 5 in which said first circuit means is a free-running multivibrator.

7. A device of the character described in claim 5 in which said second circuit means is a bi-stable multivibrator.

8. A device for converting binary code information bits of serial form into parallel form comprising a source of serial form binary information bit signals; a shift register circuit having a plurality of stages for storing the respective binary information bits of a character expressed in binary form, each stage being capable of two stable conditions of operation corresponding to the polarity of the respective binary information bits and each characterized by the production of an output energizing current pulse with each reversal of condition of operation; a free-running multivibrator for generating advance energizing current pulses and local signal energizing current pulses alternately in timed relationship with said serial form binary information bit signals; first coupling circuit means for applying said locally generated signal energizing current pulses to the first stage of said shift register circuit only upon the receipt of a serial binary information bit of a preselected polarity for producing therein the stable condition of operation selected to correspond to that polarity; second coupling circuit means for applying said advance energizing current pulses simultaneously to all stages of said shift register circuit for successively advancing the stable condition of operation produced by said signal energizing current pulses from each stage to the next succeeding stage; a bi-stable multivibrator including the necessary coupling circuit means for starting said free-running multivibrator at the beginning of each character in response to the receipt of a binary information bit of a preselected polarity and for stopping said free-running multivibrator and producing a reset energizing current at the end of each character in response to the reversal of condition of operation of the last stage of said shift register circuit; third coupling circuit means for applying said reset energizing current simultaneously to all stages of said shift register circuit for producing the condition of operation in the first stage the same as that selected to correspond to the polarity of the said preselected polarity bits and the opposite condition of operation in all other stages thereby reversing the condition of operation of all stage which are in the stable condition of operation selected to correspond to the polarity of the said preselected polarity bits and placing said shift register circuit in its initial condition of operation and individual output circuit means coupled to all stages of said first circuit means except the first in each of which an output energizing current pulse appears in response to the reversal of the condition of operation of the stage to which it is coupled.

9. A device of the type described in claim 8 in which said shift register circuit is a magnetic core shift register circuit.

10. A device of the type described in claim 9 in which said individual output circuit means are individual windings of one or more turns.

References Cited in the file of this patent

UNITED STATES PATENTS

| | | |
|---|---|---|
| 2,719,773 | Karnaugh | Oct. 4, 1955 |
| 2,758,221 | Williams | Aug. 7, 1956 |
| 2,803,812 | Rajchman et al. | Aug. 20, 1957 |

UNITED STATES PATENT OFFICE

CERTIFICATE OF CORRECTION

Patent No. 2,951,242 August 30, 1960

Charles R. Fisher, Jr., et al.

It is hereby certified that error appears in the printed specification of the above numbered patent requiring correction and that the said Letters Patent should read as corrected below.

Column 5, line 52, strike out "advancing the stable" and insert instead -- to all stages of said --; column 8, line 5, for "stage" read -- stages --.

Signed and sealed this 11th day of April 1961.

(SEAL)
Attest:

ERNEST W. SWIDER

Attesting Officer

ARTHUR W. CROCKER

Acting Commissioner of Patents